US012722977B2

(12) United States Patent
Yamagishi et al.

(10) Patent No.: US 12,722,977 B2
(45) Date of Patent: Sep. 1, 2026

(54) CARBON FILM

(71) Applicant: ZEON CORPORATION, Tokyo (JP)

(72) Inventors: Tomoko Yamagishi, Tokyo (JP); Yoshihisa Takeyama, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 480 days.

(21) Appl. No.: 18/547,926

(22) PCT Filed: Mar. 14, 2022

(86) PCT No.: PCT/JP2022/011407
§ 371 (c)(1), (2) Date: Aug. 25, 2023

(87) PCT Pub. No.: WO2022/209831
PCT Pub. Date: Oct. 6, 2022

(65) Prior Publication Data

US 2024/0140801 A1 May 2, 2024

(30) Foreign Application Priority Data

Mar. 31, 2021 (JP) ................................ 2021-061968

(51) Int. Cl.
*C01B 32/158* (2017.01)

(52) U.S. Cl.
CPC ........ *C01B 32/158* (2017.08); *C01B 2202/08* (2013.01); *C01P 2002/70* (2013.01); *C01P 2004/03* (2013.01); *C01P 2004/20* (2013.01); *C01P 2004/61* (2013.01); *C01P 2006/90* (2013.01)

(58) Field of Classification Search
None
See application file for complete search history.

(56) References Cited

FOREIGN PATENT DOCUMENTS

| | | | |
|---|---|---|---|
| JP | 2018145027 A | 9/2018 | |
| WO | WO-2005027611 A1 * | 3/2005 | ............ B33Y 70/00 |

OTHER PUBLICATIONS

Hu et al., Comparative study of structure, mechanical and electromagnetic interference shielding properties of carbon nanotube buckypapers prepared by different dispersion media, Materials & Design, 2019 (Hu) (Year: 2019).*

Machine translation of Yoshinari et al., WO 2005027611 A1 (Year: 2005).*

Takahiro Morimoto et al., Length-Dependent Plasmon Resonance in Single-Walled Carbon Nanotubes, ACS Nano, 2014, pp. 9897-9904, vol. 8, No. 10.

Oct. 3, 2023, International Preliminary Report on Patentability issued in the International Patent Application No. PCT/JP2022/011407.

May 2, 2025, the Extended European Search Report issued by the European Patent Office in the corresponding European Patent Application No. 22780052.1.

* cited by examiner

*Primary Examiner* — Keling Zhang
(74) *Attorney, Agent, or Firm* — KENJA IP LAW PC

(57) ABSTRACT

A carbon film excellent in electromagnetic shielding performance is provided. The carbon film is made of a carbon nanotube assembly and has a fractal dimension of 2.6 or more and 4 or less in a wavenumber range of 0.0001 (1/Å) or more and 0.001 (1/Å) or less when a scattering profile obtained by performing ultra-small-angle X-ray scattering on at least one surface of the carbon film is fitted to the Beaucage equation, while having a porosity of 80% or more and 95% or less.

5 Claims, 7 Drawing Sheets

INTENSITY
$10^{10}$
$10^{9}$
$10^{8}$
$10^{7}$
$10^{6}$
$10^{5}$
$10^{4}$
$10^{3}$
$10^{2}$
$10^{1}$
0.0001
0.001
0.01
0.1
q(1/Å)

INTENSITY
$10^{10}$
$10^{9}$
$10^{8}$
$10^{7}$
$10^{6}$
$10^{5}$
$10^{4}$
$10^{3}$
$10^{2}$
$10^{1}$
0.0001
0.001
0.01
0.1
q(1/Å)

OPTICAL DENSITY [ARBITRARY UNIT]
1.2
1.0
0.8
0.6
0.4
0.2
0
100
300
1000
2000
WAVENUMBER [cm⁻¹]

PORE DIAMETER [nm]
Log DIFFERENTIAL PORE VOLUME [cm 3/g]
1
10
100
400
1000
0
2
4
6
8
10
12
14

SEM IMAGE
FIG. 7A
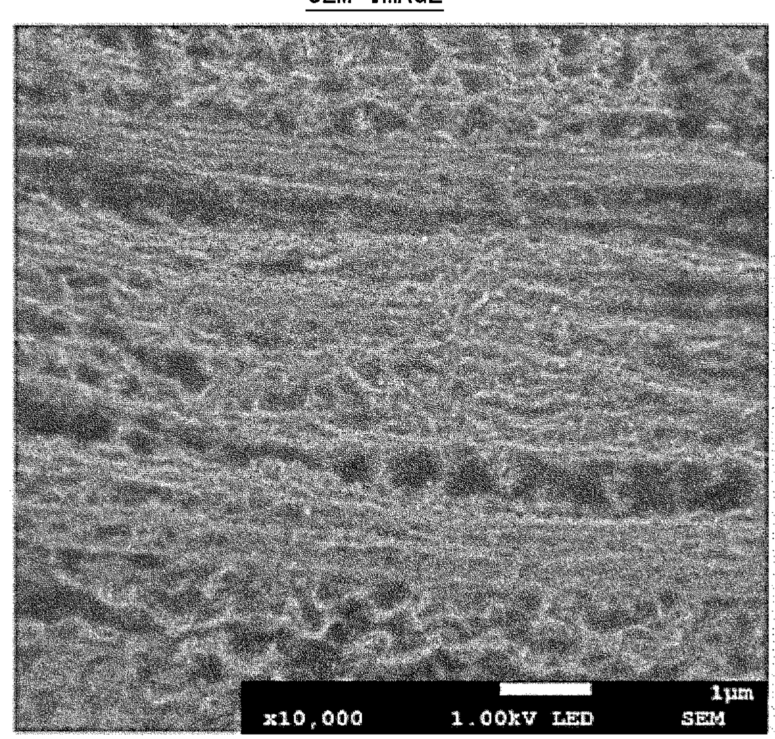
TWO-DIMENSIONAL SPATIAL FREQUENCY SPECTRUM
FIG. 7B
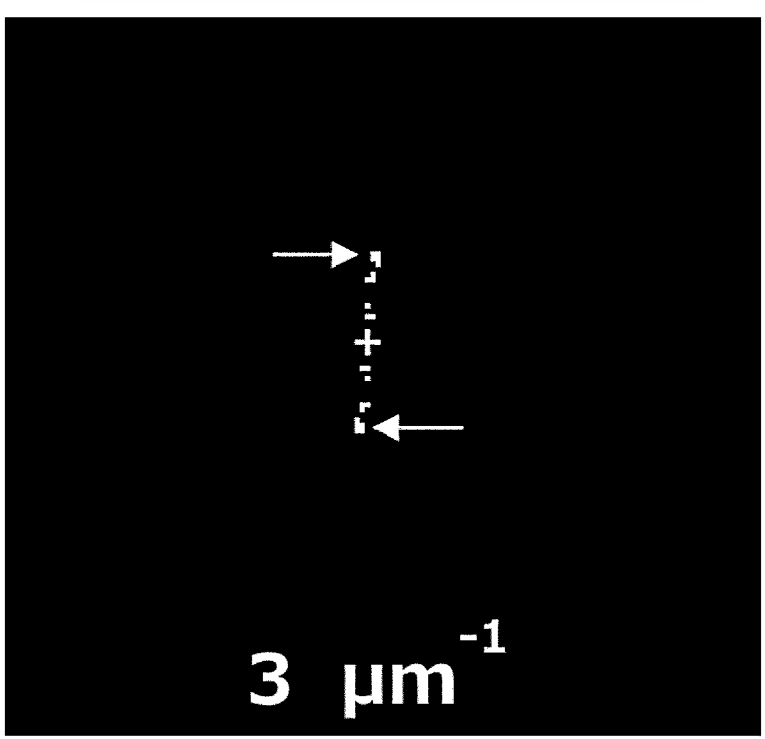

200
201
202
202a
202b
202c
202d
203
203a
203b
204
204a
204b
204c
204d
205
206
206a
206b
207
207a
207b
208
209
211
212
213
214
M

CARBON FILM

TECHNICAL FIELD

This disclosure relates to a carbon film, and more particularly, to a carbon film excellent in electromagnetic wave shielding performance.

BACKGROUND

In recent years, carbon nanotubes (hereinafter, also referred to as "CNTs") have been attracting attention as materials excellent in electrical conductivity, thermal conductivity, and mechanical characteristics. However, a CNT is a microstructure nanometer-sized in diameter, and thus inferior in handleability and workability when used alone. In light thereof, an assembly composed of a plurality of CNTs (hereinafter, referred to as "carbon nanotube assembly") is currently used, which is made into a film to form a carbon film, thereby ensuring handleability and workability enough for use in various applications (see, for example, Patent Literature (PTL) 1).

PTL 1 discloses using a carbon nanotube assembly, in which pores with a pore size of 400 to 1500 nm giving a Log differential pore volume of 0.006 $cm^3/g$ or less, as determined by mercury porosimetry, total an area of 10 nm or more, to form a carbon film having excellent mechanical strength.

CITATION LIST

Patent Literature

PTL 1: JP2018-145027A

SUMMARY

Technical Problem

In recent years, as an application of carbon films, electromagnetic wave shielding has been attracting attention. However, current carbon films have a room for further improvement in terms of electromagnetic wave shielding performance, that is, performance of shielding electromagnetic waves. It could therefore be helpful to provide a carbon film excellent in electromagnetic wave shielding performance.

Solution to Problem

Diligent investigations have been made to achieve the objectives set forth above. Through this investigation, minute properties of a carbon film made by using a carbon nanotube assembly has been studied. The result has newly found that a carbon film can favorably shield an electromagnetic wave when a predetermined parameter satisfies a predetermined condition, the predetermined parameter being obtained by performing predetermined data processing on an ultra-small-angle X-ray scattering curve (profile) on a surface of the carbon film composed of a carbon nanotube assembly, and a porosity has a predetermined value, to thereby complete the present disclosure.

That is, this disclosure aims to advantageously solve the problems set forth above, and a carbon film disclosed herein is made of a carbon nanotube assembly, the carbon film having a fractal dimension of 2.6 or more and 4 or less in a wavenumber range of 0.0001 (1/Å) or more and 0.001 (1/Å) or less when a scattering profile obtained by performing ultra-small-angle X-ray scattering measurement on at least one surface of the carbon film is fitted to the Beaucage equation, while having a porosity of 80% or more and 95% or less. A carbon film having the aforementioned configuration can exhibit excellent electromagnetic wave shielding performance.

In the present disclosure, the ultra-small-angle X-ray scattering profile of a surface of the carbon film is obtainable by the method described in Examples. The ultra-small-angle X-ray scattering profile can be fitted to the Beaucage equation in the manner described in Examples disclosed herein. The porosity of the carbon film can be measured by the method described in Examples disclosed herein.

Here, the carbon film has carbon nanotube aggregates that are preferably in a size of $1.0\times10^5$ Å or more and $4.0\times10^7$ Å or less in a wavenumber range of 0.0001 (1/Å) or more and 0.001 (1/Å) or less, when a scattering profile obtained by performing ultra-small-angle X-ray scattering measurement on at last one surface of the carbon film is fitted to the Beaucage equation. When the CNT aggregates are in a size that falls within the aforementioned predetermined range in the aforementioned predetermined wavenumber range, the carbon film can be further improved in electromagnetic wave shielding performance.

The carbon film is preferably a self-supporting film. A self-supporting carbon film is excellent in handling property, and when used as an electromagnetic wave shielding sheet, for example, the degree of freedom in arrangement of the sheet can be improved. In the present disclosure, the term "self-supporting film" refers to a film capable of maintaining a film shape alone without breaking even with no support, and in particular, a single-layer carbon film is preferred.

The carbon film preferably has a thickness of 5 μm or more and 1000 μm or less. With a thickness is 5 μm or more, the carbon film can have sufficient mechanical strength and can exhibit further excellent electromagnetic wave shielding performance. On the other hand, with a thickness of 1000 μm or less, the carbon film can be reduced in weight. In the present disclosure, the "thickness" of the carbon film can be measured using the method described in Examples disclosed herein.

The carbon film preferably has a transmission attenuation rate of 20 dB or more for at least one frequency in a range of 1 GHz or more and 10 GHz or less. With a transmission attenuation rate of 20 dB or more for at least one frequency in a range of 1 GHz or more and 10 GHz or less, the carbon film further excels in electromagnetic wave shielding performance. In the present disclosure, the transmission attenuation rate can be measured by the method described in Examples disclosed herein.

The carbon film can be advantageously used as, for example, an electromagnetic wave shielding sheet, without being particularly limited thereto.

Advantageous Effect

This disclosure is capable of providing a carbon film excellent in electromagnetic wave shielding performance.

BRIEF DESCRIPTION OF THE DRAWINGS

In the accompanying drawings:

FIG. 7A is an SEM image of the CNT assembly 1;

FIG. 7B illustrates a two-dimensional spatial-frequency spectrum of the SEM image of FIG. 7A.

DETAILED DESCRIPTION

Figure 1:
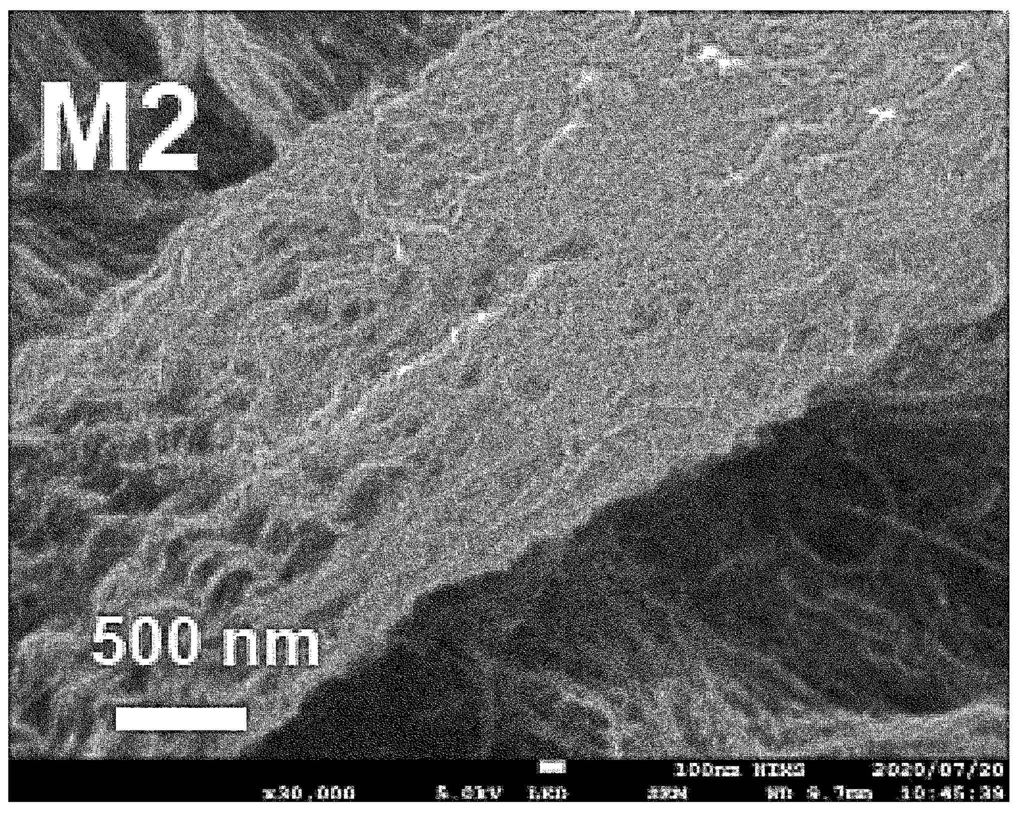
FIG. 1 is an SEM image of a surface of the carbon film of Example 1.

Hereinafter, a carbon film according to an embodiment of the present disclosure will be described in detail.

Carbon Film

The carbon film of the present disclosure is a carbon film made of a carbon nanotube assembly, the carbon film having a fractal dimension of 2.6 or more and 4 or less in a wavenumber range of 0.0001 (1/Å) or more and 0.001 (1/Å) or less when a scattering profile obtained by performing ultra-small-angle X-ray scattering measurement on at least one surface of the carbon film is fitted to the Beaucage equation, while having a porosity of 80% or more and 95% or less.

The carbon nanotube assembly includes a plurality of carbon nanotubes. In the carbon film, the ratio of CNTs in the carbon film accounts for preferably 95 mass % or more, more preferably 98 mass % or more, still more preferably 99 mass % or more, particularly preferably 99.5 mass % or more, and most preferably 100 mass % (which means the carbon film is composed only of CNTs). The carbon film may contain various additives (e.g., a dispersant) as components other than the carbon nanotube assembly, or may contain components inevitably mixed in the production process of the carbon film.

Explained below is a method for obtaining a fractal dimension by fitting the Beaucage equation to an ultra-small-angle X-ray scattering profile of the carbon-film.

<Ultra-Small-Angle X-Ray Scattering Measurement>

First, an ultra-small-angle X-ray scattering measurement is performed on a surface of the carbon film to obtain a scattered image. In the present disclosure, the ultra-small-angle X-ray scattering measurement is performed with: the wavenumber q of 0.0001 (1/Å) to 0.04 (1/Å); X-ray energy of 10 keV (0.124 nm); beamline of SPrimg-8 BL24XU, detector; APD (avalanche photodiode); and a device of Bonse&Hart USAXS. Then, a scattering profile is obtained with the wavenumber q being the horizontal axis and the scattering intensity I(q) being the vertical axis.

<Fitting of Scattering Profile>

The resulting scattering profile is then subjected to fitting using the Beaucage equation. The fitting of the scattering profile using the Beaucage equation has been hitherto known to the public, and may be performed, for example, by following a method described in G. Beaucage, J. Appl. Cryst., 28, 717 (1995). The fitting can be performed by using analysis software such as, for example, IGOR PRO 8 (produced by WaveMetrics, Inc.).

Specifically, the resulting scattering profile is subjected to fitting using the Beaucage equation represented by the general expression (I) below with a wavenumber being in a range from 0.0001 (1/Å) to 0.04 (1/Å).

[Math. 1]

$$I(q) = Bkgd + \sum_{i=1}^{N} G_i \exp\left(-q^2 R_{g,i}^2/3\right) + \frac{B_i\left[\mathrm{erf}\left(qR_{g,i}/\sqrt{6}\right)\right]^{2P_i}}{q^{P_i}} \tag{I}$$

In the general expression (I), q represents the wavenumber (1/Å), I(q) represents the scattering intensity at the wavenumber q, Bkgd represents the background, $G_i$ and $B_i$ represent the proportional constant, $P_i$ represents the fractal dimension at the hierarchy i, $R_{g,i}$ represents a structural length at the hierarchy i, and N represents the number of hierarchies.

As described above, the scattering profile is fitted to the aforementioned general expression (I), to thereby obtain the fractal dimension $P_i$ in each hierarchy i.

Then, in the present disclosure, with the fractal dimension $P_1$ falling within the range of 2.6 or more and 4 or less when i=1, the fractal dimension in the wavenumber range of 0.0001 (1/Å) or more and 0.001 (1/Å) or less is determined as being 2.6 or more and 4 or less.

In the profile of ultra-small-angle X-ray scattering in the disclosed carbon film, (1) scattering ($R_{g,1}$) derived from the size of CNT aggregates, (2) scattering ($R_{g,2}$) derived from the bundle diameter of CNTs, and (3) scattering ($R_{g,3}$) derived from the persistence length of one CNT can be observed. The three scatterings are observed as described above, the fitting may be preferably performed with the number of hierarchies being 3. For example, (1) scattering ($R_{g,1}$) derived from the size of CNT aggregates is observed in a wavenumber range of 0.0001 (1/Å) or more and 0.001 (1/Å) or less, (2) scattering derived from the CNT bundle diameter is observed in a wavenumber range of 0.001 (1/Å) or more and 0.01 (1/Å) or less, and (3) scattering ($R_{g,3}$) derived from the persistence length of one CNT is observed in a wavenumber range of 0.01 (1/Å) or more and 0.04 (1/Å) or less. In the scattering profile, the size ($R_{g,1}$) of CNT aggregates can be analyzed based on the slope of the wavenumber range of 0.0001 (1/Å) or more and 0.001 (1/Å) or less.

The reason is unclear why a carbon film that has a fractal dimension of 2.6 or more and 4 or less in a wavenumber range of 0.0001 (1/Å) or more and 0.001 (1/Å) or less, when a scattering profile obtained by performing ultra-small-angle X-ray scattering on at least one surface of the carbon film is fitted to the Beaucage equation, may exhibit excellent electromagnetic wave shielding performance, but it can be surmised as follows. That is, the fractal dimension is an index indicating the size of CNT aggregates forming the carbon film, and a carbon film having a fractal dimension of 2.6 or more and 4 or less in a wavenumber range of 0.0001 (1/Å) or more and 0.001 (1/Å) or less can presumably have CNT aggregates favorably formed therein. Then, electromagnetic waves are favorably reflected diffusely in gaps between the aggregates, attenuating the energy of electromagnetic waves that have entered the carbon film, which presumably allows the disclosed carbon film to exhibit excellent electromagnetic wave shielding performance.

When the fractal dimension exceeds 4 in the wavenumber range of 0.000 (1/Å) or more and 0.001 (1/Å) or less, CNT aggregates are not favorably formed, and electromagnetic waves are less likely to be reflected diffusely in gaps between the aggregates, which presumably deteriorates the electromagnetic wave shielding performance of the carbon film. Meanwhile, when the fractal dimension falls below 2.6 in the wavenumber range of 0.000 (1/Å) or more and 0.001 (1/Å) or less, CNT aggregates are no longer formed, which again presumably deteriorates the electromagnetic wave shielding performance of the carbon film.

Further, in a case where the profile of ultra-small-angle X-ray scattering in the disclosed carbon film is fitted in the aforementioned predetermined manner, the CNT aggregates are in a size of preferably $1.0\times10^5$ Å or more, more preferably $1.0\times10^6$ Å or more, still more preferably $5.0\times10^6$ Å or more, further more preferably $4.0\times10^7$ Å or less, preferably $2.0\times10^7$ Å or less, in the wavenumber range of 0.0001 (1/Å) or more and 0.001 (1/Å) or less. When the CNT aggregates are in a size that falls within the predetermined range in the predetermined wavenumber range, the carbon-containing film can be further improved in electromagnetic wave shielding performance.

Here, the aforementioned carbon film has wave-like structures as described in below. FIG. 1 is an SEM image of the carbon film according to Example 1 to be described later. As indicated in FIG. 1, wave-like structures are formed on a surface of the carbon film of Example 1 that has a fractal dimension of 2.6 or more and 4 or less in a predetermined wavenumber range.

Figures 2, 3:
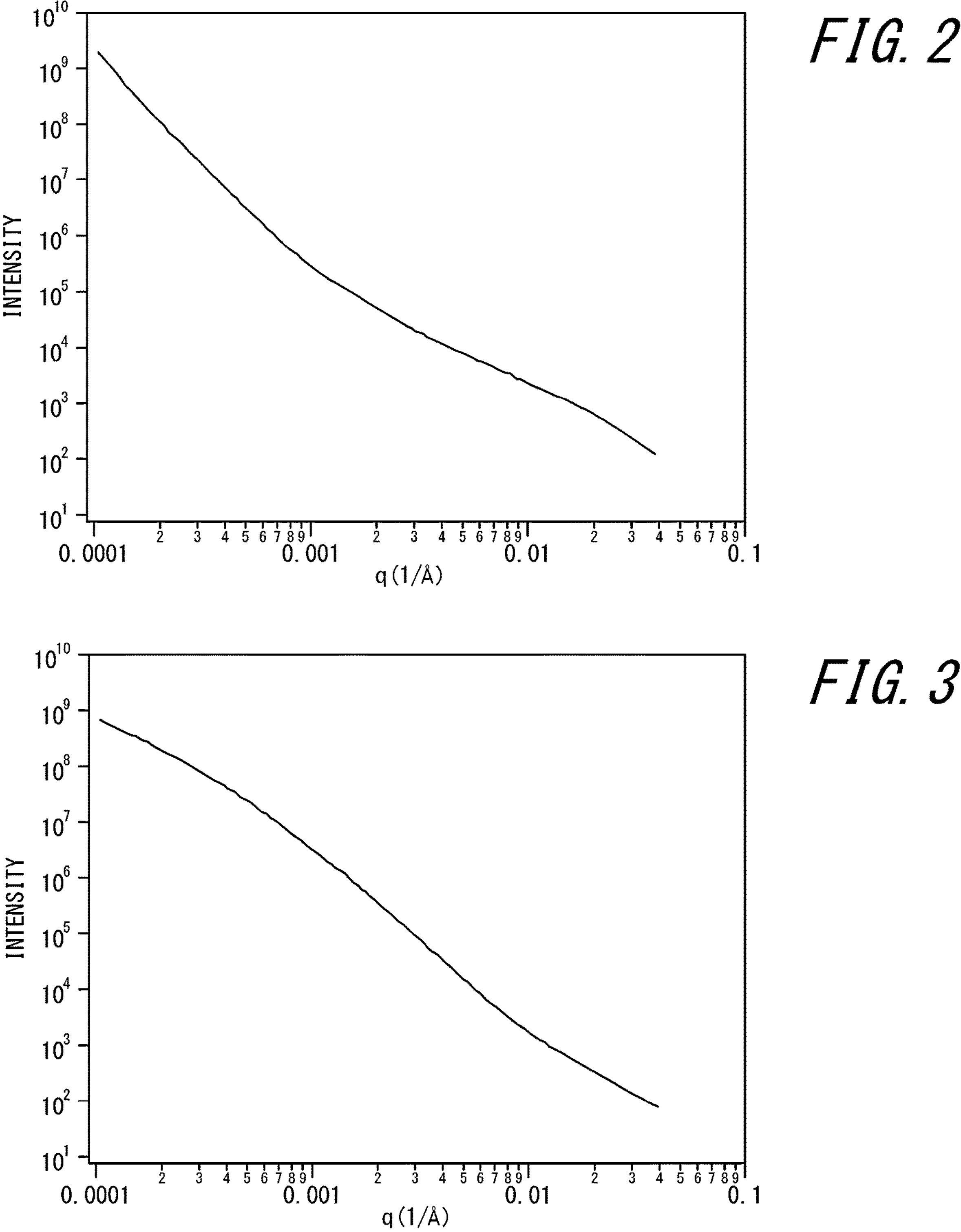
FIG. 2 is a graph obtained by fitting, to the Beaucage equation, an ultra-small-angle X-ray scattering profile on a surface of the carbon film of Example 1.
FIG. 3 is a graph obtained by fitting, to the Beaucage equation, an ultra-small-angle X-ray scattering profile on a surface of the carbon film of Comparative Example 2.

The fractal dimension $P_i$ in the general expression (I) corresponds to the absolute value for the slope of the linear portion in a graph obtained by fitting the scattering profile to the Beaucage equation. FIG. 2 is a graph obtained by fitting, to the Beaucage equation, an ultra-small-angle X-ray scattering profile on a surface of the carbon film according to Example 1 to be described later. FIG. 3 is a graph obtained by fitting, to the Beaucage equation, an ultra-small-angle X-ray scattering profile on a surface of the carbon film of Comparative Example 2 to be described later. The absolute value for the slope of the linear portion in the wavenumber range of 0.0001 (1/Å) or more and 0.001 (1/Å) or less of FIG. 2 is greater than the absolute value for the slope of the linear portion in the wavenumber range of 0.0001 (1/Å) or more and 0.001 (1/Å) or less of FIG. 3. That is, in the graph of FIG. 2, the slope of the linear portion in the wavenumber range of 0.0001 (1/Å) or more and 0.001 (1/Å) or less is steeper, which means the fractal dimension is closer to 4, i.e., the aggregates are larger.

In the disclosed carbon film, in view of further improving electromagnetic wave shielding performance, the aforementioned fractal dimension is preferably 2.7 or more, more preferably 2.8 or more, and preferably 3.9 or less, more preferably 3.7 or less, in the wavenumber range of 0.0001 (1/Å) or more and 0.001 (1/Å) or less. Further, preferably both surfaces of the carbon film have the fractal dimension of 2.6 or more and 4 or less in a wave number range of 0.0001 (1/Å) or more and 0.001 (1/Å) or less.

In the disclosed carbon film, to control the aforementioned fractal dimension, for example, the dispersion conditions of CNTs (such as dispersion strength, the duration of the dispersion, whether to use a dispersant, and the like) may be controlled in preparing a CNT dispersion liquid to be described later so as to control a CNT bundle length and the like to be described later. For example, in a case of using a stirring blade to disperse CNTs, the rotational speed (rpm) of the stirring blade and/or the duration of the dispersion and/or the shape of the stirring blade may be varied to change the CNTs in bundle length.

The disclosed carbon film has a porosity of 80% or more and 95% or less.

For example, the porosity of the carbon film may be determined as follows. That is, the fabricated carbon film is cut into a 1-cm square to prepare a test piece. The test piece is measured for the mass (g) to calculate the density (bulk density) of the carbon film by Equation (1) below. Then, the obtained bulk density may be used to calculate the porosity of the carbon film by Equation (2) below.

$$\text{Bulk density (g/cm}^3\text{)}=\text{mass (g) of the test piece}/(1\ \text{cm}^2\times\text{thickness (cm) of the test piece}) \quad (1)$$

$$\text{Porosity}=(1-(\text{bulk density of carbon film (g/cm}^3)/1.3))\times100 \quad (2)$$

In Equation (2), "1.3" indicates the true density (g/cm$^3$) of carbon.

When the carbon film has a porosity of 80% or more, the carbon film can have enhanced electromagnetic wave absorption characteristics. Meanwhile, when the porosity is 95% or less, the self-supporting property of the carbon film can be sufficiently maintained, which contributes to providing a carbon film having favorable handleability and workability.

<Electromagnetic Wave Shielding Performance>

The disclosed carbon film has a transmission attenuation rate of 25 dB or more preferably for at least one frequency in a range of 1 GHz or more and 10 GHz or less, and more preferably has a transmission attenuation rate of 25 dB or more for all the frequencies in the range of 1 GHz or more and 10 GHz or less. The carbon film having a transmission attenuation rate of 25 dB or more for all the frequencies in the aforementioned range is further excellent in electromagnetic wave shielding performance, and thus can be more advantageously used as an electromagnetic wave shielding sheet.

<Thickness>

The disclosed carbon film has a thickness of preferably 5 μm or more, more preferably 10 μm or more, preferably 1000 μm or less, and more preferably 700 μm or less. The carbon film having a thickness of 5 μm or more can have sufficient mechanical strength and exhibit further excellent electromagnetic wave shielding performance. On the other hand, the carbon film having a thickness of 1000 μm or less can be reduced in weight.

The disclosed carbon film may have a thickness of 150 μm or more, 200 μm or more, 300 μm or more, or 600 μm or less, 300 μm or less, 200 μm or less.

Method for Producing Carbon Film

The disclosed carbon film can be fabricated by satisfying at least one of the following (A) and (B) in making a carbon nanotube assembly into a film to form a carbon film.

(A) Using, as the CNT assembly, a CNT assembly that satisfies at least one of Conditions (1) to (3) mentioned below.

(B) Subjecting the CNT assembly to dry pulverization, prior to making the CNT assembly into a film.

<CNT Assembly>

Here, the CNT assembly for use in preparing a carbon film may be selected from a novel CNT assembly that satisfies at least one of Conditions (1) to (3). A carbon film composed of the CNT assembly that satisfies at least one of Conditions (1) to (3) below is excellent in electromagnetic wave shielding performance.

Condition (1): When the carbon nanotube assembly is dispersed so as to have a bundle length of 10 μm or more to thereby obtain carbon nanotube dispersions, the carbon nanotube dispersions thus obtained have at least one peak based on the plasmon resonance in a wavenumber range of more than 300 $cm^{-1}$ and 2000 $cm^{-1}$ or less in a spectrum obtained by subjecting the dispersions to Fourier transform infrared spectroscopy.

Condition (2): The carbon nanotube assembly has the largest peak in a range of the pore size of more than 100 nm and less than 400 nm, in the pore distribution curve indicating a relation between the pore size and the Log differential pore volume, obtained from the adsorption isotherm at 77 K of liquid-nitrogen, based on Barrett-Joyner-Halenda method.

Condition (3): The electron-microscopic image of the carbon nanotube assembly has at least one peak of the two-dimensional spatial-frequency spectrum in a range of 1 $\mu m^{-1}$ or more and 100 $\mu m^{-1}$ or less.

Figure 4:
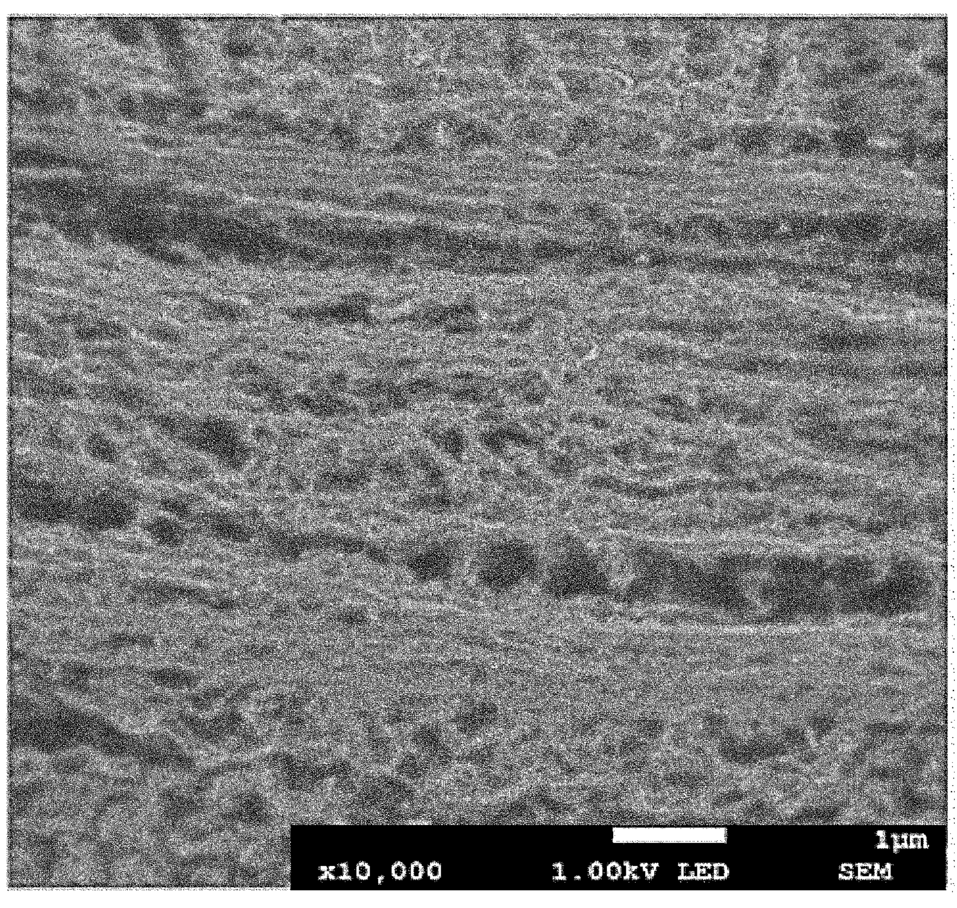
FIG. 4 is an SEM image of an exemplary CNT assembly that may be used in the disclosed carbon film.

The reason is unclear why a carbon film composed of a CNT assembly that satisfies at least one of Conditions (1) to (3) above is excellent in electromagnetic wave shielding performance, but it can be surmised as follows. FIG. 4 illustrates a scanning electron microscopic (SEM) image of an exemplary CNT assembly that satisfies at least one of Conditions (1) to (3) above. As indicated in FIG. 4, CNTs constituting a CNT assembly that satisfies at least one of Conditions (1) to (3) above have wave-like structures. Such "wave-like structures" can be considered to cause electromagnetic waves to be diffusely reflected between the respective CNTs constituting the CNT assembly. During such diffused reflection, the electromagnetic waves presumably lose their energy, which is likely to contribute to high electromagnetic wave shielding performance. Conditions (1) to (3) above that can be satisfied by the disclosed CNT assembly will be described in detail below.

<<Condition (1)>>

Condition (1) provides: "when the carbon nanotube assembly is dispersed so as to have a bundle length of 10 μm or more to thereby obtain carbon nanotube dispersions, the carbon nanotube dispersions thus obtained have at least one peak based on the plasmon resonance in a wavenumber range of more than 300 $cm^{-1}$ and 2000 $cm^{-1}$ or less in a spectrum obtained by subjecting the dispersions to Fourier transform infrared spectroscopy". Here, as the optical properties of CNTs, CNTs have been widely known to have a high absorbance in the far-infrared region. The diameter and length of CNTs are believed to contribute to such a high absorbance in the far-infrared region. Note that the absorbance in the far-infrared region, more specifically, the relationship between the peak based on the plasmon resonance of CNTs and the length of CNTs is discussed in detail in Non-Patent Literature (NPL) (T. Morimoto et. al., "Length-Dependent Plasmon Resonance in Single-Walled Carbon Nanotubes", pp 9897 to 9904, Vol. 8, No. 10, ACS NANO, 2014). The investigation described in NPL above and our unique knowledge have led to an estimation that the position detected for a peak based on the plasmon resonance of CNTs in the spectrum obtained through Fourier transform infrared spectroscopy can be influenced by the distance between defective points in the CNTs, and such an estimation was verified. Then, it was found that the position detected for the peak based on the plasmon resonance of CNTs can serve as an index corresponding to the path between the bending points in CNTs having wave-like structures, based on which Condition (1) above has been created.

Under Condition (1), when a peak based on the plasmon resonance of CNTs is found in a wavenumber range of more than 300 $cm^{-1}$ and 2000 $cm^{-1}$ or less, preferably in a wavenumber range of 500 $cm^{-1}$ or more and 2000 $cm^{-1}$ or less, more preferably in a wavenumber range of 700 $cm^{-1}$ or more and 2000 $cm^{-1}$ or less, a carbon film formed with such CNTs can exhibit favorable electromagnetic wave shielding performance.

Figure 5:
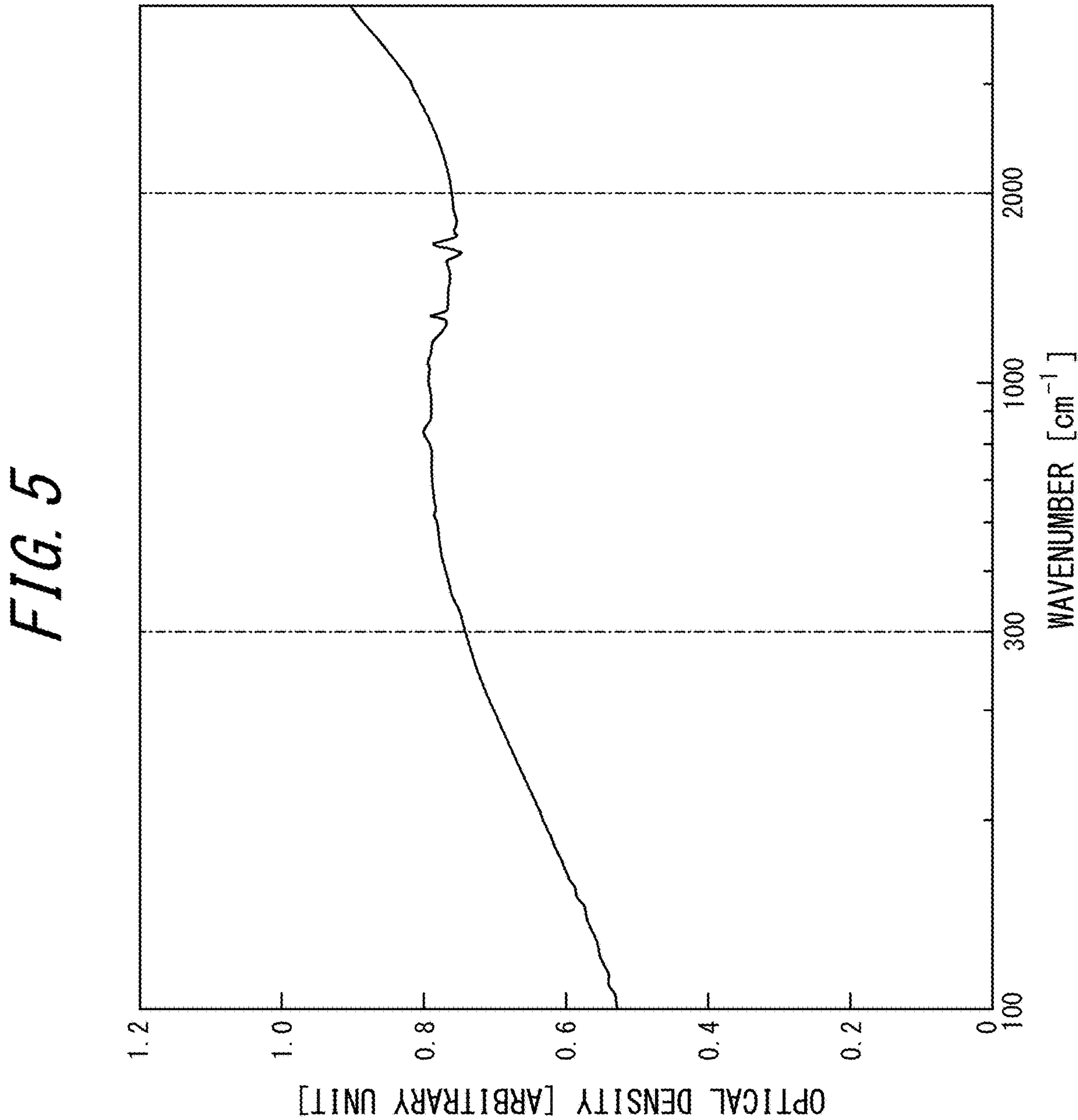
FIG. 5 is an FIR resonance chart acquired for the CNT assembly 1 used in Examples disclosed herein.

FIG. 5 is a spectrum (an FIR resonance chart) acquired by subjecting an exemplary CNT assembly, to Fourier transform infrared spectroscopy. As is apparent from FIG. 5, in the spectrum thus acquired, acute peaks are observed in the vicinity of the wavenumber of 840 $cm^{-1}$, in the vicinity of 1300 $cm^{-1}$, and in the vicinity of 1700 $cm^{-1}$, other than the relatively gentle peaks based on the plasmon resonance of the CNT dispersions. These acute peaks each correspond to infrared absorption derived from functional groups, without corresponding to the "peaks based on the plasmon resonance of the carbon nanotube dispersions". More specifically, the acute peak in the vicinity of the wavenumber of 840 $cm^{-1}$ is resulting from C—H out-of-plane angular oscillations; the acute peak in the vicinity of the wavenumber of 1300 $cm^{-1}$ is resulting from epoxy-three-membered ring stretching oscillations; and the acute peak in the vicinity of the wavenumber of 1700 $cm^{-1}$ is resulting from C═O stretching oscillations. In the region where the wavenumber is more than 2000 $cm^{-1}$, peaks similar to the Si peak are detected, apart from those based on the plasmon resonance, as is also mentioned in NPL by T. Morimoto et al. described above. Thus, for Condition (1), the upper limit of the determination of the presence or absence of the peak based on the plasmon resonance of the CNT dispersions has been set to $2000^{-1}$ cm or less.

Here, in acquiring a spectrum through Fourier transform infrared spectroscopy under Condition (1), the CNT dispersions need to be obtained by dispersing the CNT assembly so as to have a bundle length of 10 μm or more. Here, for example, the CNT assembly, water, and a surfactant (for example, sodium dodecylbenzenesulfonate) may be blended at appropriate ratios, and the mixture may be stirred for a predetermined period of time by ultrasonic waves or the like, to thereby obtain a dispersion liquid in which the CNT dispersions having a bundle length of 10 μm or more are dispersed in water.

The bundle length of the CNT dispersions can be obtained by analysis with a wet-image analysis-type particle size measuring apparatus. The aforementioned measuring apparatus can calculate an area of the respective dispersions based on images obtained by photographing the CNT dispersions, and obtain a diameter of a circle having an area equal to the area thus calculated (hereinafter, also referred to as an ISO circle diameter (ISO area diameter)). Then, in the present disclosure, the bundle length of each dispersion is defined as a value equal to the ISO circle diameter obtained in this manner.

<<Condition (2)>>

Condition (2) provides that "the largest peak in the pore distribution curve is in a range of the pore size of more than 100 nm and less than 400 nm". The pore distribution of the carbon nanotube assembly can be determined from the adsorption isotherm at 77 K of liquid nitrogen based on BJH method. Then, when the peak in the pore distribution curve obtained by measuring the carbon nanotube assembly is found in the range of more than 100 nm, it means that gaps of certain sizes are found between CNTs in the carbon nanotube assembly, and thus CNTs are not excessively aggregated to be overcrowded. The upper limit of 400 nm corresponds to a measurement limit in the measurement apparatus (BELSORP-mini II) used in Examples.

Here, in view of further improving the electromagnetic wave shielding performance of the carbon film, the Log differential pore volume at the largest peak of the pore distribution curve of the CNT assembly is preferably 2.0 $cm^3/g$ or more.

<<Condition (3)>>

Condition (3) provides that "the electron-microscopic image of the carbon nanotube assembly has at least one peak of the two-dimensional spatial-frequency spectrum in a range of 1 $\mu m^{-1}$ or more and 100 $\mu m^{-1}$ or less". The sufficiency of the condition can be determined in the following manner. First, the CNT assembly to be determined is observed under magnification (e.g., 10000×) with an electron microscope (e.g., an electrolytic emission scanning electron microscope), to thereby obtain a plurality of electron-microscopic images (e.g., ten images) each in the field of view of 1-cm four sides. The plurality of electron-microscopic images thus obtained are subjected to a fast Fourier Transform (FFT) process to obtain a two-dimensional spatial-frequency spectrum. The two-dimensional spatial-frequency spectrum obtained for each of the plurality of electron-microscopic images is binarized to obtain an average value of the peak positions that appear on the highest frequency side. When the average value of the peak positions thus obtained is 1 $\mu m^{-1}$ or more and 100 $\mu m^{-1}$ or less, it is determined that Condition (3) is satisfied. Here, the "peak" referenced in the aforementioned determination uses a clear peak obtained by performing an isolated point extraction process (that is, reverse operation of isolated point removal). Therefore, when a clear peak cannot be obtained within a range of 1 $\mu m^{-1}$ or more and 100 $\mu m^{-1}$ or less through performing the isolated point extracting process, it is determined that Condition (3) is not satisfied.

Here, in view of further improving the electromagnetic wave shielding performance of the carbon film, the peak of the two-dimensional spatial-frequency spectrum is preferably found in a range of 2.6 $\mu m^{-1}$ or more and 100 $\mu m^{-1}$ or less.

Then, in view of further improving the electromagnetic wave shielding performance of the carbon film, the CNT assembly preferably satisfies at least two of Conditions (1) to (3), and more preferably satisfies all Conditions (1) to (3).

<<Other Properties>>

The CNT assembly that can be used for forming the carbon film disclosed herein preferably has the following properties, in addition to those set forth in Conditions (1) to (3) above.

For example, the CNT assembly has a total specific surface area of by the BET method of preferably 600 $m^2/g$ or more, more preferably 800 $m^2/g$ or more, still more preferably 900 $m^2/g$ or more, preferably 2600 $m^2/g$ or less, more preferably 1400 $m^2/g$ or less. Further, the total specific surface area for the CNT assembly that has been subjected to opening treatment is preferably 1300 $m^2/g$ or more. The CNT assembly having a higher specific surface area is capable of more favorably reflecting diffusely electromagnetic waves in the carbon film, with the result that the carbon film can be further improved in electromagnetic wave shielding performance. The CNT assembly mainly includes single-walled CNTs and may also include double-walled CNTs or multi-walled CNTs, to the extent of not compromising its functionality. The total specific surface area of CNTs by the BET method can be measured by using, for example, a BET specific surface area measuring apparatus conforming to JIS Z8830.

The average length of CNTs constituting the CNT assembly is preferably 10 μm or more and 10 cm or less, more preferably 100 μm or more and 2 cm or less, still more preferably 150 μm or more and 2 cm or less. When the average length of CNTs constituting the CNT assembly is 10 μm or more, CNTs can be prevented from aggregating with neighboring CNT bundles and can readily be dispersed. When the average length of CNTs constituting the CNT assembly is 10 μm or more, a network of CNTs can readily be formed, allowing CNTs to be suitably used in applications where electrical conductivity or mechanical strength is required. When the average length of CNTs constituting the CNT assembly is equal to or less than 10 cm, the CNT assembly can be generated in a shorter time, which can suppress adhesion of carbon-based impurities and can thus increase the specific surface area. When the average length of CNTs constituting the CNT assembly is equal to or less than 2 cm, CNTs can more readily be dispersed. The average length of CNTs can be determined by measuring the lengths of 100 randomly selected CNTs with a scanning electron microscope (SEM).

The CNT assembly has a tapped bulk density, which is preferably 0.001 $g/cm^3$ or more and 0.2 $g/cm^3$ or less, and more preferably 0.02 $g/cm^3$ or more and 0.2 $g/cm^3$ or less. The CNT assembly having a density in such ranges does not excessively enhance the linkage between CNTs, and thus has excellent dispersibility and can be molded into various shapes. When the CNT assembly has a tapped bulk density of 0.2 $g/cm^3$ or less, the linkage between CNTs is weakened, making it easy for the CNT assembly to be uniformly dispersed when stirred into a solvent or the like. Further, when the CNT assembly has a tapped bulk density of 0.001 $g/cm^3$ or more, the CNT assembly is further improved in integrity, making it easy to handle. The tapped bulk density is an apparent bulk density obtained in a state in which the CNT assembly in powder form is filled in a container, and then tapped or vibrated to reduce voids between the powder particles, so that the assembly in powder form is densely filled.

Furthermore, CNTs constituting the CNT assembly has an average outer diameter, which is preferably 0.5 nm or more, more preferably 1.0 nm or more, preferably 15.0 nm or less, more preferably 10.0 nm or less, still more preferably 5.0 nm or less, further more preferably 4.0 nm or less. When the average outer diameter of CNTs is 0.5 nm or more, the bundling of CNTs can be reduced, maintaining a higher specific surface area. When the average outer diameter of CNTs is 15.0 nm or more, the ratio of multi-walled CNTs can be reduced, maintaining a higher specific surface area. Here, the average outer diameter of CNTs can be determined by measuring the diameters (outer diameters) of 100 randomly selected CNTs, with a transmission electron microscope (TEM). The average diameter (Av) and the standard deviation (σ) of the CNTs may be adjusted by varying the production method and the production conditions of the CNTs, or may be adjusted by combining a plurality of types of CNTs obtained by different production methods.

The CNT assembly has a G/D ratio, which is preferably 1 or more and 50 or less. A CNT assembly having a G/D ratio of less than 1 is considered to be low in crystallinity of the single-walled CNT, and largely contaminated with substances such as amorphous carbon while having a larger content of the multi-walled CNT. On the other hand, a CNT assembly having a G/D ratio of more than 50 is highly linear, and CNTs tend to form bundles with less gaps, which may reduce the specific surface area. The G/D ratio is an index commonly used to evaluate the quality of CNTs. In the Raman spectrum of CNT measured by the Raman spectrometer, oscillatory modes called G-band (near 1600 $cm^{-1}$) and D-band (near 1350 $cm^{-1}$) are observed. The G band is a vibration mode derived from hexagonal lattice structures of graphite appearing as cylindrical surfaces of the CNTs, and the D band is a vibration mode derived from amorphous locations. Therefore, as the peak intensity ratio of the G band to the D band (G/D ratio) is higher, the CNTs are evaluated as having higher crystallinity (linearity).

To obtain a higher specific surface area, the purity of the CNT assembly is desirably as high as possible. As used herein, the term "purity" refers to carbon purity, which indicates the percentage by mass of the CNT assembly composed of carbon. There is no upper limit on the purity in order to obtain a higher specific surface area, but in terms of production, it is difficult to obtain a CNT assembly with the purity of 99.9999 mass % or more. When the purity is less than 95 mass %, it becomes difficult to obtain a specific surface area exceeding 1000 $m^2$/g without opening treatment. Further, when the CNT assembly contains metal impurities and thus has a carbon purity of less than 95 mass %, the metal impurities react with oxygen in the opening treatment to hinder the opening of CNTs, making it difficult to increase the specific surface area as a result. From the foregoing, the purity of the single-walled CNTs is preferably 95 mass % or more.

The purity of the predetermined CNT assembly satisfying at least one of Conditions (1) to (3) above is usually 98 mass % or more, and preferably 99 mass % or more, even without being subjected to purifying process. Such CNT assembly is hardly contaminated with impurities, and thus the characteristics inherent in CNTs can be sufficiently exhibited. The carbon purity of the CNT assembly can be obtained from elemental analysis using fluorescent X-rays, thermogravimetric analysis (TGA), or the like.

<<Method for Producing CNT Assembly>>

The method for producing the CNT assembly is not particularly limited, and the production conditions can be adjusted according to the properties desired. For example, in producing a CNT assembly that satisfies at least one of Conditions (1) to (3) described above, conditions under which the CNT assembly grows must satisfy all of Conditions (a) to (c) described below.

(a) The growth rate of the CNT assembly is 5 μm/min or more.

(b) The concentration of a catalyst-activating material in the growing atmosphere of the CNT assembly is 4 volume % or more.

(c) During the growth of the CNT assembly, an obstacle is found in the direction of growth of CNTs constituting the CNT assembly.

Then, a production method satisfying all Conditions (a) to (c) described above is capable of efficiently producing a CNT assembly satisfying at least one of Conditions (1) to (3) described above. Further, such a manufacturing method can employ any CNT synthesis step according to a known technique, such as a fluidized bed technique, a moving bed technique, or a fixed bed technique, without any particular limitation as long as Conditions (a) to (c) above are satisfied when the CNT assembly is being grown. Here, the fluidized bed technique refers to a synthesis method for synthesizing CNTs while fluidizing particulate carriers (hereinafter, also referred to as particulate catalyst supports) supporting thereon a catalyst for synthesizing CNTs. The moving bed technique and the fixed bed technique refer to a synthesis method for synthesizing CNTs without fluidizing carriers (particulate carriers or plate-shaped carriers) each supporting a catalyst thereon.

In one example, the production method satisfying all Conditions (a) to (c) described above includes a catalyst support forming step of forming catalyst supports, a CNT synthesis step using the catalyst supports obtained in the catalyst support forming step, and a recovery step of recovering CNTs synthesized in the CNT synthesis step. Then, the catalyst support forming step can be carried out according to a known wet or dry catalyst supporting method. Further, the recovery step can be carried out using a known separation and recovery apparatus such as a classification apparatus.

[CNT Synthesis Step]

The CNT synthesis step is carried out so as to satisfy all of Conditions (a) to (c) above when CNTs are grown. Specifically, the concentration, the temperature, and the like of a source gas serving as the carbon source in CNT growth atmosphere may be adjusted as appropriate so as to satisfy Condition (a) of "the growth rate of the carbon nanotube assembly is 5 μm/min or more". Here, the source gas serving as the carbon source is not particularly limited, and a hydrocarbon gas such as methane, ethane, ethylene, propane, butane, pentane, hexane, heptane, propylene, and acetylene; a lower alcohol gas such as methanol and ethanol; and a mixture thereof can be used. The source gas may be diluted with an inert gas. Further, in view of further improving the electromagnetic wave shielding performance of the carbon film while further enhancing the dispersibility of the resulting CNT assembly, the growth rate of the CNT assembly is preferably 10 μm/min or more. The temperature can be adjusted, for example, in a range of 400° C. to 1100° C.

Under the CNT growing atmosphere, the source gas serving as the carbon source preferably includes ethylene. When ethylene is heated in a predetermined temperature range (700° C. or more and 900° C. or less), the decomposition reaction of ethylene is accelerated, and when the resulting decomposition gas is brought into contact with the catalyst, CNTs can grow at high speed. However, when the thermal decomposition time is too long, the ethylene-decomposition reaction proceeds excessively, causing catalyst deactivation and attachment of carbon impurities to the CNT assembly. In the production of the CNT assembly of the present disclosure, the thermal decomposition time is preferably in a range of 5 seconds or more and 10 seconds or less with respect to the ethylene concentration in a range of 0.1 volume % or more and 40 volume % or less. When the thermal decomposition time is less than 0.5 seconds, the thermal decomposition of ethylene is insufficient, making it difficult to grow at high speed a CNT assembly having a high specific surface area. When the thermal decomposition time is longer than 10 seconds, ethylene is excessively decomposed, generating a large amount of carbon impurities, which causes catalyst deactivation and degradation of the CNT assembly. The thermal decomposition time is calculated from the following equation:

$$(\text{Thermal Decomposition Time})=(\text{Heating Channel Volume})/\{(\text{Source Gas Flow Rate})\times(273.15+T)/273.15\}$$

Here, the heating channel volume refers to a volume of a channel heated to a predetermined temperature T° C., which the source gas passes through prior to contacting the catalyst. The source gas flow rate refers to a flow rate at 0° C. and 1 atm.

Further, the supply rate of the catalyst activating material supplied during CNT growth may be adjusted as appropriate, to thereby satisfy Condition (b) of "the concentration of a catalyst-activating material in the growing atmosphere of the CNT assembly is 4 volume % or more". In view of further improving the electromagnetic wave shielding performance of the carbon film, the catalytic activator content in the growing atmosphere of CNT assembly is preferably 5 volume % or more. The catalyst activating material may include water, oxygen, ozone, acid gas, nitrogen oxide, low carbon number oxygenates such as a carbon monoxide and a carbon dioxide; alcohols such as ethanol, methanol; ethers such as tetrahydrofuran; ketones such as acetone; aldehydes; esters; and mixtures thereof, with a carbon dioxide being preferred. Note that a substance, such as carbon monoxide or alcohols, which contains both carbon and oxygen, may serve both as a source gas and as a catalyst activating material. For example, carbon monoxide acts as a catalyst activating material when combined with a highly reactive source gas such as ethylene, and acts as a source gas when combined with a catalyst activating material such as water that exhibits a large catalytic activating action even at a small amount.

Furthermore, in the CNT synthesis step, the fluidized bed technique may be selected or the arrangement interval of the catalyst supports may be adjusted in the moving bed technique or the fixed bed technique, to thereby satisfy Condition (c) of "during the growth of the CNT assembly, an obstacle is found in the direction of growth of CNTs constituting the CNT assembly".

Here, when CNTs are synthesized by the fluidized bed technique, the CNT synthesis step may be performed, for example, by supplying a source gas while supplying a gas from below to cause the particulate catalyst supports to fluidized, or by supplying a source gas while continuously conveying particulate catalyst supports through the rotation of screws.

The catalyst support includes a carrier and a catalyst carried on a surface of the carrier, and the carrier forms a portion constituting a matrix structure for supporting the catalyst by attaching, fixing, film forming, or forming the catalyst on the surface of the carrier. The carrier may be structured by including the carrier alone, or may be structured as a carrier with an underlayer configured by providing a given underlayer for favorably supporting the catalyst on the surface of the carrier. The carrier is preferably in a particulate shape, and the particle diameter thereof is preferably 1 mm or less, more preferably 0.7 mm or less, still more preferably 0.65 mm or less, and preferably 0.05 mm or more, in volume-average particle diameter. When the particle diameter is equal to or less than the upper limit, the growing CNT bundles become thinner, which is advantageous in forming wave-like structures. The particle density is preferably 3.8 g/cm$^3$ or more, more preferably 5.8 g/cm$^3$ or more, and preferably 8 g/cm$^3$ or less, in terms of apparent density. When the particle density is equal to or greater than the lower limit, more force is applied to the growing CNT bundles, which is advantageous to form wave-like structures. The support may be formed of a material which is preferably a metallic oxide containing any one or more elements of Al and Zr. Of those, zirconia beads containing Zr having a large element amount are particularly preferred.

For example, in the case of using particulate carriers, a method for supporting the catalyst on the surface of each particulate carrier includes, for example, a method using a rotary drum coating apparatus having a substantially cylindrical rotary drum. In the case of supporting the catalyst after providing the underlayer on the surface of each particulate carrier, a solution containing a component that can constitute the underlayer is sprayed onto the surface of each particulate carrier and dried to dispose the underlayer on the surface of the carrier, a prior to spraying and drying the catalyst solution. According to such a method, the catalyst layer or the underlayer can be formed relatively easy and evenly.

In the CNT synthesis step, a "formation step" of reducing the catalyst supported on the catalyst support is performed prior to the "growth step" which is performed so as to satisfy Conditions (a) to (c) above, and a "cooling step" of cooling the catalyst support on which CNTs have grown can be performed after the growth step is completed. In the "formation step", for example, an atmosphere containing the catalyst support is used as a reducing gas atmosphere, and at least one of the reducing gas atmosphere and the catalyst support is heated, to thereby reduce and atomize the catalyst supported on the catalyst support. The temperature of the catalyst support or the reducing gas atmosphere in the formation step is preferably 400° C. or higher and 1100° C. or lower. Further, the formation step may be performed for 3 minutes or more and 120 minutes or less. As the reducing gas, for example, a hydrogen gas, an ammonia gas, water vapor, and a mixed gas thereof may be used. Furthermore, the reducing gas may be a mixed gas obtained by mixing of these gases with an inert gas such as a helium gas, an argon gas, or a nitrogen gas. On the other hand, in the "cooling step", the catalyst support on which CNTs have grown is cooled in an inert gas environment. Here, as the inert gas, an inert gas similar to the inert gas that can be used in the growth step can be used. Further, in the cooling step, the temperature of the catalyst support on which CNTs have grown is preferably lowered to 400° C. or less, more preferably 200° C. or less.

<Dry Pulverization>

In obtaining the disclosed carbon film, the CNT assembly prior to the film formation may be subjected to dry pulverization as needed. In the present disclosure, the term "dry pulverization" means a pulverization in a state in which an object to be pulverized contains substantially no solvent (for example, the object has a solid content concentration of 95% or more).

A pulverization apparatus that can be used in the dry pulverization is not particularly limited as long as the apparatus can apply a physical load by stirring or the like to an assembly composed of fine structures. As such an apparatus, a mixer with rotating blades may be used.

Conditions for the pulverization are not particularly limited. For example, when a mixer with a rotary blade is used as the pulverization apparatus, the rotational velocity is preferably 500 rpm or more and 5000 rpm or less, and the pulverization duration is preferably 10 seconds or more and 20 minutes or less.

<Filmization>

To obtain the disclosed carbon film, a CNT assembly may be made into a film. Here, the method for making a CNT assembly into a film is not particularly limited, and preferably includes a method of dispersing a CNT assembly in a dispersion medium such as water or an organic solvent to prepare a CNT dispersion liquid and removing at least a part of the dispersion medium from the CNT dispersion liquid.

The method for preparing the CNT dispersion liquid is not particularly limited, and the CNT dispersion liquid may be obtained by dispersing a CNT assembly in a dispersion medium by a known method such as a dispersion method with a stirring blade, a dispersion method with ultrasonic waves, or a dispersion method with a shearing force such as by a high-pressure wet jet mill.

Here, preferred conditions for each dispersion method for obtaining the disclosed carbon film are as follows.

When using the dispersion method with a stirring blade, the dispersion of CNTs in the dispersion medium is preferably performed for 1 minute or more and 120 minutes or less, more preferably 5 minutes or more and 100 minutes or less, with the rotational speed of the stirring blade being 1500 rpm or more and 12500 rpm or less, more preferably 2000 rpm or more and 10000 rpm or less. Dispersion using a stirring blade may be performed using a known dispersing apparatus having a stirring blade.

When using the dispersion method with ultrasonic waves, the dispersion of CNTs in the dispersion medium is preferably performed at a frequency of 50 kHz or more and 500 kHz or less, for 1 minute or more and 120 minutes or less, more preferably for 2 minutes or more and 100 minutes or less. The dispersion using ultrasonic waves can be performed using a known ultrasonic disperser.

When using the dispersion method by a wet jet mill, the dispersion of CNTs in the dispersion medium is performed preferably under a pressure of 20 to 200 MPa and preferably for 5 to 30 minutes. The dispersion by a wet jet mill can be carried out using a known wet jet mill apparatus.

Further, in view of further enhancing the electromagnetic wave shielding performance of the obtained carbon film, CNTs are preferably dispersed moderately in the CNT dispersion liquid. Preferably, the CNT dispersion liquid is free of dispersant. In other words, the CNT dispersion liquid consists essentially of CNTs and a dispersion medium. In the present specification, the phrase "the CNT dispersion liquid consists essentially of CNTs and a dispersion medium" means that 99.9 weight % or more of the constituent components of the CNT dispersion liquid are composed of CNTs and inevitable impurities associated with CNTs, and a dispersion medium and inevitable impurities associated with the dispersion medium.

Then, the dispersion medium may be removed from the CNT dispersion liquid by known methods such as filtering and drying.

The method for filtering is not particularly limited, and known filtration methods such as natural filtration, vacuum filtration (suction filtration), pressure filtration, and centrifugal filtration may be used.

As the method for drying, known drying methods such as a hot air drying method, a vacuum drying method, a hot roll drying method, or an infrared ray irradiation method may be used. The drying temperature is not particularly limited, but usually from room temperature to 200° C. The drying time is not particularly limited, but usually not less than 1 hour and within 48 hours. The drying may be performed on a known substrate, without being particularly limited.

Among these, at least drying is preferably employed for removing the dispersion medium.

The aforementioned filtration and drying may be used in combination. For example, the membrane-like filtrate (primary sheet) obtained by filtering the CNT dispersion liquid can be further dried to obtain the disclosed carbon film.

EXAMPLES

The following provides more specific description of the present disclosure through Examples. However, the present disclosure is not limited to these Examples.

In Examples and Comparative Examples, various measurements and evaluations were performed as follows.

<Ultra-Small-Angle X-ray Scattering Measurement>

The carbon film prepared as described later was cut into a 1.5-cm square to obtain a test piece. Then, the obtained test piece was subjected to ultra-small-angle X-ray scattering measurement under the following conditions to obtain a scattered image.

[Measurement Conditions]

X-ray energy: 10 keV (0.124 nm)
Beam line: SPrimg-8 BL24XU
Detector: APD (avalanche photodiode)
q (wavenumber) range: 0.0001 (1/Å) to 0.04 (1/Å)
Apparatus: Bonse&Hart USAXS <Processing of Data Obtained by Ultra-Small-Angle X-Ray Scattering Measurement>

A scattering profile was obtained for the scattered image obtained by the ultra-small-angle X-ray scattering measurement according to the above. The resulting scattering profile was fitted to the Beaucage equation represented by the aforementioned general expression (I), using IGOR PRO 8 (produced by WaveMetrics Inc.) as analysis software, with the wavenumber ranging from 0.0001 (1/Å) to 0.04 (1/Å), to thereby obtain the fractal dimension $P_i$ in each hierarchy i and the size $R_{g,i}$ (Å) of the CNT aggregates. The number of hierarchies is set to N=3. Here, the fitting indicates an error between the measured scattering profile and the calculated value.

$$\sqrt{\chi^2/N} \quad \text{[Math. 2]}$$

The fitting was carried out so that the value obtained from the mathematical formula 2 is 10 or less. When the value is 10 or less, the fitting can be regarded as having been favorably carried out. Table 1 indicates values for the fractal dimension $P_1$, and the size $R_{g,1}$ of the CNT aggregates.

<Fourier Transform Infrared Spectroscopy (FT-IR)>

To 10 mg of the CNT assembly, 100 g of water was added, the water containing sodium dodecylbenzenesulfonate at 1 mass % as a surfactant, and the mixture was stirred at a 45 Hz for 1 minute using an ultrasonic bath to obtain a 100 ml of dispersion liquid for each CNT assembly. The dispersion liquids thus prepared were each diluted two-fold with solvents of the same composition, dropped on a silicon-substrate and dried, and thereafter measured using a Fourier transform infrared spectrophotometer to obtain plasmon far-infrared (FIR) resonance charts, and the resonance peaks thereof were obtained. The plasmon peak top positions were obtained based on an approximate curve obtained by polynomial fit, using computer-aided design software.

<CNT Bundle Length Measurement>

The dispersion liquids fabricated for the FT-IR measurement were each measured for the ISO circle diameter average value of the CNT dispersions found in the dispersion liquid, using a flow-type particle image analysis apparatus (circulation image analysis particle size distribution meter "CF-3000", produced by JUSCO International Co., Ltd.), and the obtained value was defined as the CNT bundle length. The analysis conditions were as follows.

[Analysis Conditions]

Injection volume: 50 ml (sampling volume 1.2%)
Flow cell spacer: 1000 μm
Front lens magnification: 2×
Telecentric lens magnification: 0.75×
Length per pixel: 2.3 μm/pixel Each dispersion liquid was measured four times under the same conditions while being circulated, and their arithmetic mean values were determined.

<Creation of Pore Distribution Curve (CNT Assembly)>

The adsorption isotherm was measured for 10 mg or more of the CNT assembly, with a BELSORP-mini II (produced by MicrotracBEL Corp.), using a liquid nitrogen at 77 K (with adsorption equilibration period being 500 seconds). As a pretreatment, the CNT assembly was subjected to vacuum degassing at 100° C. for 12 hours. From the adsorption volume of the adsorption isotherm, the pore distribution curves were obtained by BJH method for each sample. In the preparation of the pore distribution curve of the CNT assembly, the pore diameter was measured in a range of 1 nm or more and 400 nm or less.

Two-Dimensional Spatial Frequency Spectral Analysis of Electron Microscopic Image For the CNT assembly 1 prepared according to the procedure to be described later, 0.01 mg thereof was placed on a carbon tape and blown by a blower to remove excess CNTs to prepare a sample, which was observed at 10000 times by an electrolytic radiation scanning electron microscope, and ten images were each taken in an arbitrary extracted field of view of 1-cm four sides. The ten electron microscope images were subjected to fast Fourier transform process to obtain two-dimensional spatial frequency spectra. The obtained two-dimensional spatial frequency spectra were each subjected to binarization process to obtain the peak positions that appeared on the outermost side (high frequency side), and the average value thereof was obtained. In the binarization process, for the numerical values obtained through the fast Fourier transform process, values greater than 0.75 were set to 1 and other values were set to zero.

<Thickness>

The thickness of the carbon film was measured using a "Digimatic Standard Outside Micrometer" produced by Mitutoyo Corporation.

<Porosity>

The fabricated carbon film was cut into a 1-cm square to prepare a test piece, and the mass (g) of the test piece was measured to calculate the density (bulk density) of the carbon film by Equation (1) below. Then, the porosity of the carbon film was calculated by Equation (2) below using the obtained bulk density.

$$\text{Bulk density (g/cm}^3\text{)} = \text{mass (g) of the test piece}/(1\ \text{cm}^2 \times \text{thickness (cm) of the test piece}) \quad (1)$$

$$\text{Porosity} = (1 - (\text{bulk density of carbon film (g/cm}^3\text{)}/1.3)) \times 100 \quad (2)$$

In Equation (2), Note that "1.3" indicates the true density (g/cm$^3$) of carbon.

<Electromagnetic Wave Shielding Performance>

The carbon film was measured for the reflection coefficient S11 and the transmission coefficient S21 by the microstrip line method based on IEC-62333-2, and the transmission attenuation factor "dB" was calculated as the electromagnetic wave shielding performance.

Then, the electromagnetic wave shielding performances [dB] at the measured frequencies of 2.5 MHz, 4.5 MHz, and 7.5 MHz were evaluated by the following criteria. When the transmission attenuation factor [dB] at a certain frequency is higher, the carbon film is more excellent in electromagnetic wave shielding performance at that frequency.

A: The transmission attenuation factor is 25 dB or more.

B: The transmission attenuation factor is 20 dB or more and less than 25 dB.

C: The transmission attenuation factor is less than 20 dB.

Example 1

<Preparation of CNT Assembly 1>

Figure 8:
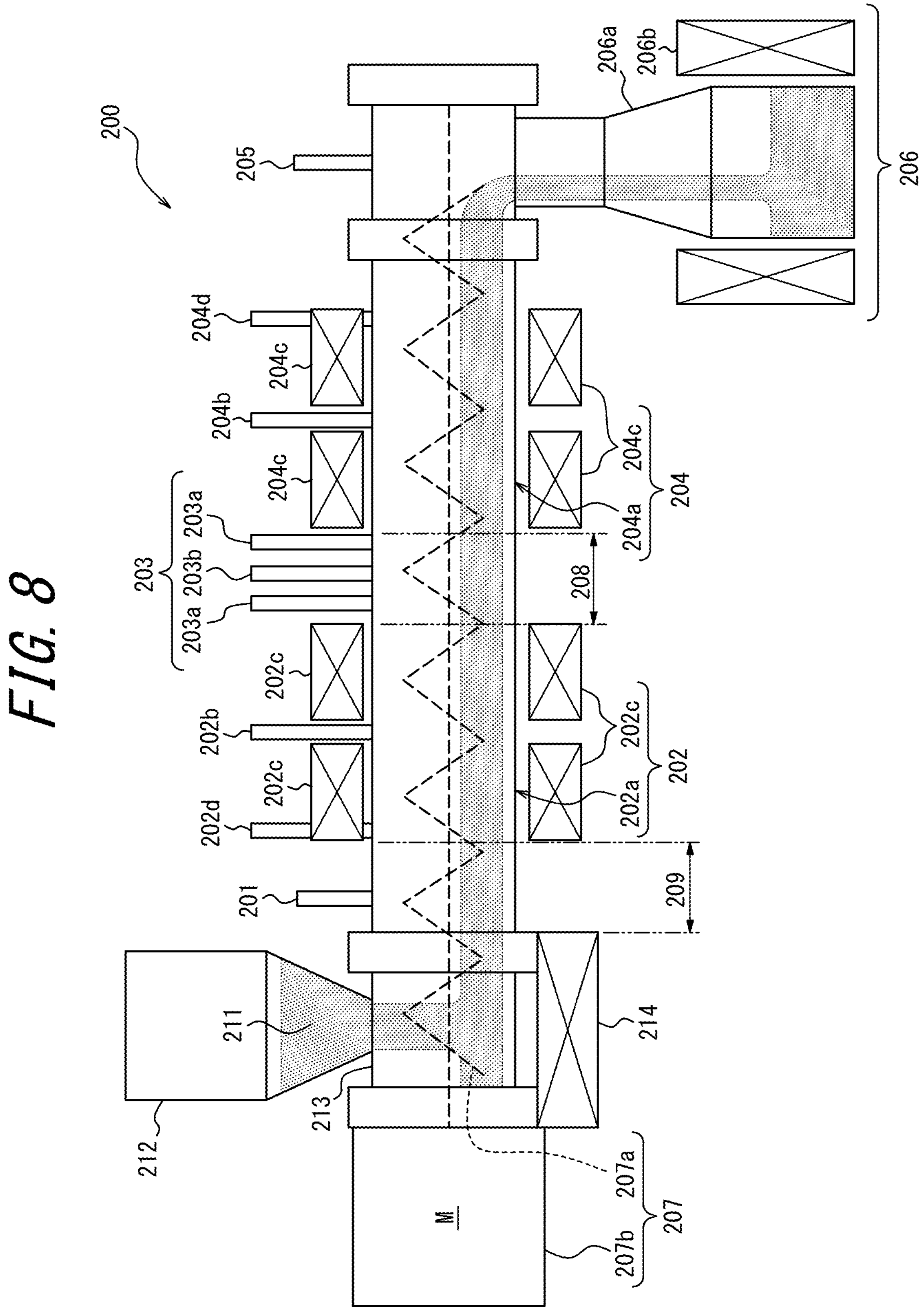
FIG. 8 illustrates a schematic configuration of a production apparatus for the CNT assembly 1.

The CNT assembly 1 used in Example 1 is fabricated by supplying the source gas while continuously conveying the particulate catalyst supports by screw rotation in the CNT synthesis step. FIG. 8 illustrates a schematic configuration of the CNT assembly production apparatus 200 used. The CNT assembly production apparatus 200 of FIG. 8 includes a formation unit 202, a growth unit 204, a conveyance unit 207 that conveys a substrate from the formation unit 202 to pass through the growth unit 204, a connecting portion 208 that spatially connects the formation unit 202 and the growth unit 204 to each other, and a gas intrusion prevention system 203 that prevents gases from being mixed with each other between the formation unit 202 and the growth unit 204. Further, the CNT assembly production apparatus 200 includes components such as an inlet purge system 201 disposed in a stage preceding the formation unit 202, an outlet purge system 205 disposed in a stage following the growth unit 204, and a cooling unit 206 disposed in a stage following the outlet purge system 205. The formation unit 202 includes a formation furnace 202*a* for holding a reducing gas, a reducing gas injection system 202*b* for injecting the reducing gas, a heater 202*c* for heating at least one of the catalyst and the reducing gas, an exhauster 202*d* for discharging a gas in the furnace to the outside of the system, and the like. The gas intrusion prevention system 203 includes an exhauster 203*a* and a purge gas injection system 203*b* for injecting a purge gas (sealing gas). The growth unit 204 includes a growth furnace 204*a* for holding a source gas environment, a source gas injection apparatus 204*b* for injecting the source gas, a heater 204*c* for heating at least one of the catalyst and the source gas, an exhauster 204*d* for discharging a gas in the furnace to the outside of the system, and the like. The inlet purge system 201 is attached to a connecting portion 209 that connects the formation furnace 202*a* with the front chamber 213 as a component for introducing a substrate 211 into the system via the hopper 212. The cooling unit 206 includes a cooling container 206*a* for holding an inert gas, and a water-cooling chiller 206*b* disposed so as to surround a space within the cooling container 206*a*. The conveyance unit 207 is a unit that continuously conveys the substrate 211 by screw rotation, and is implemented by a screw blade 207*a* and a driver 207*b* capable of rotating the screw blade so as to exert a substrate conveying ability. The heater 214 is configured to be able to heat the inside of the system at a temperature lower than the heating temperature in the formation unit, and heats the vicinity of the driver 207*b*.

<Catalyst Layer Forming Step>

Zirconia (zirconium dioxide) beads ($ZrO_2$ with a volume-average particle diameter D50: 650 μm) were charged as the substrate into a rotary drum coating apparatus, where the zirconia beads, while being stirred, were applied with an aluminum-containing solution sprayed by a spray gun (at a spray volume of 3 g/minute, spray duration of 940 seconds, spray air pressure of 10 MPa), and dried under a compressed air supplied to the rotary drum (at 300 L/minute), whereby an aluminum-containing coating film was formed on the zirconia beads. Next, calcination treatment was performed at 480° C. for 45 minutes to prepare primary catalyst particles on which an aluminum oxide layer was formed. Further, the primary catalyst particles were charged into another rotary drum coating apparatus, where the primary catalyst particles, while being stirred, were applied with an iron catalyst solution sprayed by a spray gun (at a spray volume of 2 g/minute, spray duration of 480 seconds, spray air pressure of 5 MPa), and dried under a compressed air (300 L/minute) supplied into the rotary drum, whereby an iron containing coating film was formed on the primary catalyst particles. Next, a calcination treatment was performed at 220° C. for 20 minutes to fabricate a substrate on which an iron oxide layer was further formed.

<<CNT Synthesis Step>>

The substrate thus fabricated, which has a catalyst on the surface, was charged into a feeder hopper of the CNT assembly production apparatus, and subjected to the formation step, the growth step, and the cooling step in this order while being conveyed by a screw conveyor, to thereby fabricate the CNT assembly 1.

<Formation Step to Cooling Step>

Conditions for the inlet purge system, the formation unit, the gas intrusion prevention system, the growth unit, the outlet purge system, and the cooling unit of the CNT assembly production apparatus were set as follows.

Feeder Hopper
- Feed rate: 1.25 kg/h
- Exhaust volume: 10 sLm (with natural exhaust from gaps)

Inlet Purge System
- Purge gas: Nitrogen 40 sLm

Formation Unit
- Temperature inside the furnace: 800° C.
- Reducing Gases: nitrogen 6 sLm, hydrogen 54 sLm
- Exhaust Volume: 60 sLm
- Processing Time: 20 minutes Gas Intrusion Prevention System
- Purge Gas: 20 sLm
- Exhaust Volume of the Exhauster: 62 sLm Growth Unit
- Temperature in Furnace: 830° C.
- Source Gases: nitrogen 15 sLm, ethylene 5 sLm, carbon dioxide 1 sLm, hydrogen 3 sLm
- Volume: 47 sLm
- Processing Time: 10 minutes Outlet Purge System
- Purge gas: Nitrogen 45 sLm Cooling Unit
- Cooling Temperature: Room Temperature
- Exhaust volume: 10 sLm (natural exhaust from gaps)

Under the aforementioned conditions, CNT assemblies were continuously produced.

<Separation and Recovery Step>

The CNT assembly 1 synthesized on the substrate was separated and recovered using a forced vortex classifier (at a rotational speed of 2300 rpm with an air volume of 3.5 $Nm^3$/min). The recovery rate of CNT assembly 1 was 96%.

The properties of the CNT assembly 1 produced according to the present Example were represented by the following typical values: the tapped bulk density of 0.02 g/$cm^3$; the CNT average length of 150 μm; the BET specific surface area of 900 $m^2$/g; the average outer diameter of 4.0 nm; and the carbon purity of 99%.

Here, the CNT assembly 1 was confirmed to have a peak based on the plasmon resonance of the CNT dispersions. FIG. 5 is an FIR resonance chart of FIR spectrum of the CNT assembly 1. As illustrated in FIG. 5, the CNT assembly 1 was identified to have a peak of optical density at 835 $cm^{-1}$, and thus Condition (1) above was satisfied.

Figure 6:
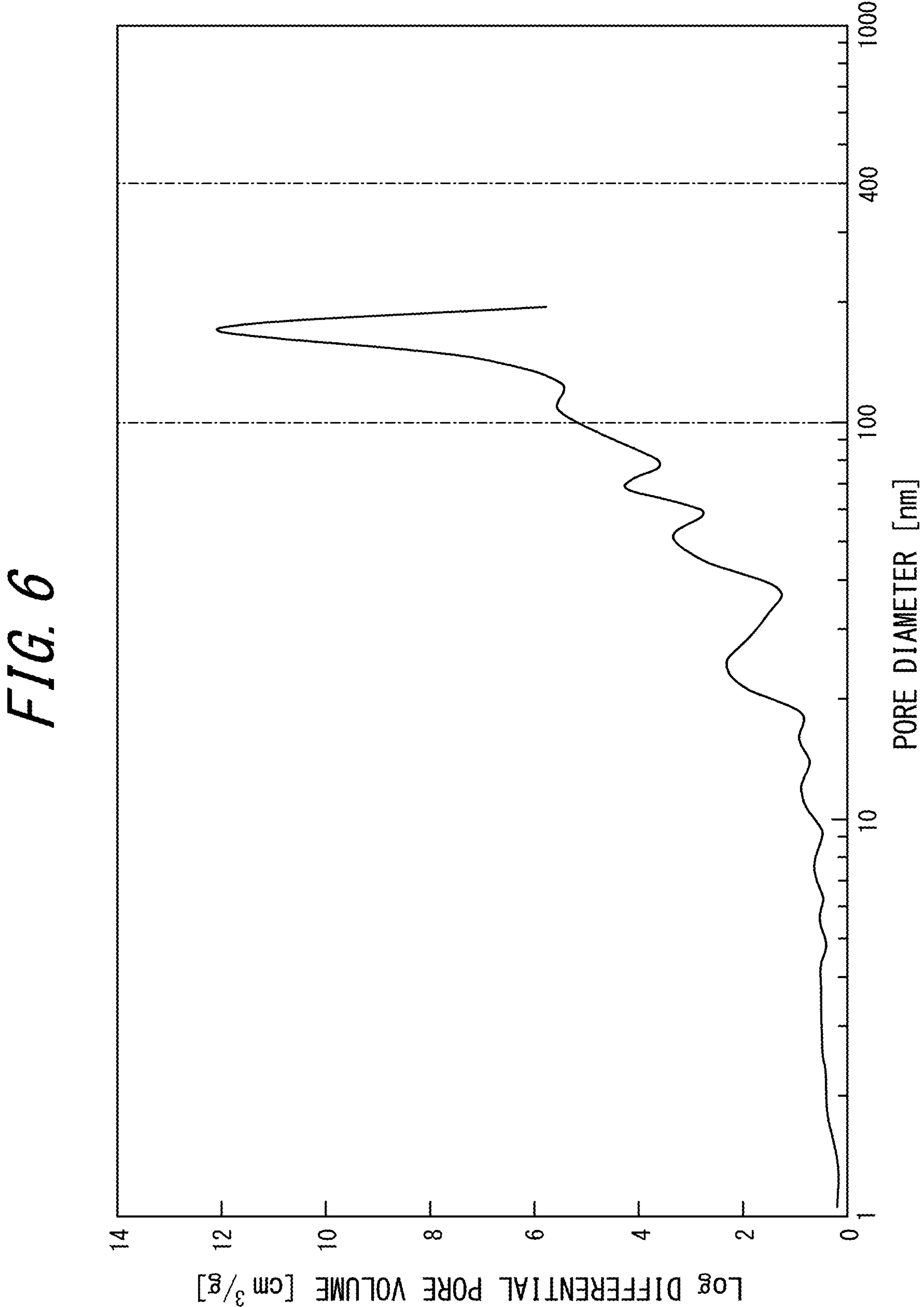
FIG. 6 illustrates a pore distribution curve of the CNT assembly 1.

Further, as illustrated in FIG. 6, the CNT assembly 1 was confirmed to have the largest peak of the Log differential pore volume in a region having the pore diameter of 100 nm or more, and thus Condition (2) above was satisfied.

In addition, the CNT assembly 1 was confirmed to have at least one of the peaks in a range of 1 $\mu m^{-1}$ or more and 100 $\mu m^{-1}$ or less, and Condition (3) above was satisfied. This can be verified from the following circumstances. FIG. 7A is one of the ten images acquired for the prepared CNT assembly 1. FIG. 7B is a two-dimensional spatial-frequency spectrum acquired for the images. In FIG. 7B, a component closer to the center means a lower-frequency component, and a component located further outward from the center corresponds to a higher-frequency component. In the drawing, the arrows designate the peak positions (3 $\mu m^{-1}$) of the highest wavenumbers among the distinct peaks detected in a region of 1 to 100 $\mu m^{-1}$.

To 1 g of the CNT assembly 1 obtained as above, 1000 g of water was added, and stirred with an ultra-high-speed emulsifying dispersion apparatus (product name "LABOLUTION®" (LABOLUTION is registered trademark in Japan, other countries, or both), produced by Thinky Co., Ltd.) at a rotational speed of 300 rpm for 10 minutes, to thereby obtain a CNT dispersion liquid.

The resulting CNT dispersion liquid was applied onto a substrate. The coating formed on the substrate was vacuum dried at a temperature of 80° C. for 24 hours to form a carbon film on the substrate. Thereafter, the carbon film was peeled off from the substrate to obtain a carbon film (self-supporting film) of 543 μm in thickness. The obtained carbon film was subjected to various measurements and data analysis, and also evaluated for electromagnetic wave shielding performance. The results are in Table 1.

Example 2

A carbon film (self-supporting film) of 261 μm in thickness was obtained in the same manner as in Example 1, except that the stirring for the preparation of the CNT dispersion liquid was performed at a 7500 rpm for 15 minutes with an ultra-high-speed emulsifying dispersion apparatus (product name "LABOLUTION®", produced by Thinky Co., Ltd.). The obtained carbon film was evaluated for electromagnetic wave shielding performance. The results are in Table 1.

Example 3

A carbon film (self-supporting film) of 190 μm in thickness was obtained in the same manner as in Example 1, except that the mixture was subjected to dispersion treatment using a jet mill (produced by with an ultra-high-speed emulsifying dispersion apparatus (product name "NANOVATOR®" (NANOVATOR is registered trademark in Japan, other countries, or both), produced by Yoshida Kikai Co., Ltd.) under the condition of 100 MPa for 15 minutes, so as to prepare a CNT dispersion liquid. The obtained CNT dispersion liquid was subjected to various measurements and data analysis, and also evaluated for electromagnetic wave shielding performance. The results are in Table 1.

Comparative Example 1

To 1 g of the CNT assembly 1 obtained as above, 1000 g of an aqueous solution including 1 mass % of sodium dodecylbenzene sulfonate (SDBS) as a dispersant was mixed to obtain a coarse dispersion liquid, and the coarse dispersion liquid was treated using a jet mill (product name "NANOVATOR®", produced by Yoshida Kikai Co., Ltd.)

under a condition of 100 MPa for 15 minutes, to thereby obtain a CNT dispersion liquid. The CNT dispersion liquid thus obtained was applied onto the substrate. The coating on the substrate was vacuum dried at a temperature of 80° C. for 24 hours to form a carbon film on the substrate. Thereafter, the carbon film was peeled off from the substrate to obtain a carbon film (self-supporting film) of 181 μm in thickness. The obtained carbon film was subjected to various measurements and data analysis, and also evaluated for electromagnetic wave shielding performance. The results are in Table 1.

Comparative Example 2

A carbon film (self-supporting film) of 159 μm in thickness was obtained in the same manner as in Example 1, except that, instead of the CNT assembly 1, SGCNTs (product name "ZEONANO SG101", produced by Zeon Corporation) as single-walled CNTs were used. In preparing the CNT dispersion liquid, the mixture was stirred at a rotation speed of 10000 rpm for 60 minutes with the super-high-speed emulsifying dispersion apparatus (product name "LAVOLUTION®", produced by Thinky Co., Ltd.). The obtained carbon film was evaluated for electromagnetic wave shielding performance. The results are in Table 1.

Here, the aforementioned SGCNTs were identified to have a peak of optical density at 230 $cm^{-1}$ in an FIR resonance chart of FIR spectrum, failing to satisfy Condition (1). In addition, the aforementioned SGCNTs had no largest peak of the Log differential pore volume in the region where the pore size is 100 nm or more, failing to satisfy Condition (2). In addition, the aforementioned SGCNTs had no clear peak obtained within the range of 1 $\mu m^{-1}$ or more and 100 $\mu m^{-1}$ or less, failing to satisfy Condition (3).

Comparative Example 3

A carbon film (self-supporting film) of 154 μm in thickness was obtained in the same manner as in Example 3, except that, instead of the CNT assembly 1, the aforementioned SGCNTs (product name "ZEONANO SG101", produced by Zeon Corporation) were used. The obtained carbon film was evaluated for electromagnetic wave shielding performance. The results are in Table 1.

Comparative Example 4

To 1 g of the aforementioned SGCNTs, 1000 g of an aqueous solution containing 1 mass % of sodium dodecylbenzene sulfonate (SDBS) as a dispersant was mixed to obtain a coarse dispersion liquid, and the coarse dispersion liquid was subjected to dispersion treatment using a jet mill (product name "NANOVATOR®", produced by Yoshida Kikai Co., Ltd.) under a condition of 100 MPa for 15 minutes, to thereby obtain a CNT dispersion liquid. The resulting CNT dispersion liquid was applied onto a substrate. The coating formed on the substrate was vacuum dried at a temperature of 80° C. for 24 hours to form a carbon film on the substrate. Thereafter, the carbon film was peeled off from the substrate to obtain a carbon film (self-supporting film) of 50 μm in thickness. The obtained carbon film was subjected to various measurements and data analysis, and also evaluated for electromagnetic wave shielding performance. The results are in Table 1.

TABLE 1

| | | | Example 1 | Example 2 | Example 3 | Comparative Example 1 | Comparative Example 2 | Comparative Example 3 | Comparative Example 4 |
|---|---|---|---|---|---|---|---|---|---|
| CNTs used | | | CNT assembly 1 | CNT assembly 1 | CNT assembly 1 | CNT assembly 1 | | SG101 | |
| CNT assembly | Condition (1) | FIR resonance peak [$cm^{-1}$] | 835 | 835 | 835 | 835 | 230 | 230 | 230 |
| | Condition (2) | Peak at fine pore diameter of 100-400 nm | observed | observed | observed | observed | not observed | not observed | not observed |
| | Condition (3) | Two-dimensional spatial frequency spectrum peak at 1-100 $\mu m^{-1}$ (peak position) | observed (3 $\mu m^{-1}$) | observed (3 $\mu m^{-1}$) | observed (3 $\mu m^{-1}$) | observed (3 $\mu m^{-1}$) | not observed | not observed | not observed |
| Method for fabricating CNT dispersion liquid | | Apparatus used | LABO-LUTION | LABO-LUTION | jet mill | jet mill | LABO-LUTION | jet mill | jet mill |
| | | Dispersion method | stirring blade | stirring blade | shearing stress | shearing stress | stirring blade | shearing stress | shearing stress |
| | | Dispersant | not used | not used | not used | used | not used | not used | used |
| | | Rotational speed [rpm] | 3000 | 7500 | — | — | 10000 | — | — |
| | | Pressure [MPa] | — | — | 100 | 100 | — | 100 | 100 |
| | | Duration of dispersion [min.] | 10 | 15 | 15 | 15 | 60 | 15 | 15 |
| Carbon film | Fractal dimension Analysis range: 0.0001 to 0.001 (1/Å) | | 3.63 | 2.98 | 3.23 | 3.04 | 2.54 | 2.45 | 1.66 |
| | Porosity [%] | | 95 | 91 | 80 | 75 | 87 | 72 | 65 |
| | Size of CNT aggregates [Å] Analysis range: 0.0001 to 0.001 (1/Å) | | $5.49 \times 10^6$ | $5.47 \times 10^6$ | $1.96 \times 10^7$ | $2.00 \times 10^6$ | $4.28 \times 10^8$ | $1.01 \times 10^8$ | $1.95 \times 10^4$ |
| Evaluation | Electro-magnetic wave shielding performance | 2.5 GHz | A | A | A | B | B | C | C |
| | | 4.5 GHz | A | A | A | C | B | B | C |
| | | 7.5 GHZ | A | A | A | B | B | C | C |

As can be seen from Table 1, carbon films have a transmission attenuation rate of 25 dB or more at any measurement frequency and are excellent in electromagnetic wave shielding performance, with a fractal dimension of 2.6 or more and 4 or less being in a wavenumber range of 0.0001 (1/Å) or more and 0.001 (1/Å) or less when a scattering profile obtained by performing ultra-small-angle X-ray scattering on at least one surface of the carbon films is fitted to Beaucage equation, while having a porosity of 80% or more and 95% or less.

In contrast, carbon films of Comparative Examples of 1 to 4 have a transmission attenuation rate of less than 25 dB at least in any of the measurement frequencies, as they have a fractal dimension outside of 2.6 or more and 4 or less in a wavenumber range of 0.0001 (1/Å) or more and 0.001 (1/Å) or less when a scattering profile obtained by performing ultra-small-angle X-ray scattering on at least one surface of the carbon films is fitted to the Beaucage equation, or have a porosity outside of 80% or more and 95% or less, which means they are inferior to the carbon films of Examples 1 to 3 in terms of electromagnetic wave shielding property.

INDUSTRIAL APPLICABILITY

According to the present disclosure, a carbon film having excellent electromagnetic wave shielding performance can be provided.

REFERENCE SIGNS LIST

200 CNT assembly production apparatus
201 inlet purge system
202 formation unit
**202*a*** formation furnace
**202*b*** reducing gas injection system
**202*c*** heater
**202*d*** exhauster
203 gas intrusion prevention system
**203*a*** exhauster
**203*b*** purge gas injection system
204 growth unit
**204*a*** growth furnace
**204*b*** source gas injection system
**204*c*** heater
**204*d*** exhauster
205 outlet purge system
206 cooling unit
**206*a*** cooling vessel
**206*b*** water-cooling chiller
207 conveyance unit
**207*a*** screw blade
**207*b*** driver
208, 209 connector
211 substrate
212 hopper
213 front chamber
214 heater

The invention claimed is:

1. A carbon film made of a carbon nanotube assembly, the carbon film having a fractal dimension of 2.6 or more and 4 or less in a wavenumber range of 0.0001 (1/Å) or more and 0.001 (1/Å) or less when a scattering profile obtained by performing ultra-small-angle X-ray scattering on at least one surface of the carbon film is fitted to Beaucage equation shown below to obtain a fractal dimension Pi at each hierarchy i, the fractal dimension being $P_1$ corresponding to hierarchy i=1, while having a porosity of 80% or more and 95% or less:

$$I(q) = Bkgd + \sum_{j=1}^{N} G_i \exp\left(-q^2 R_{g,i}^2/3\right) + \frac{B_i\left[\operatorname{erf}\left(qR_{g,s}/\sqrt{6}\right)\right]^{3P_i}}{q^{P_i}} \tag{I}$$

where q represents the wavenumber (1/Å), I(q) represents the scattering intensity at the wavenumber q, Bkgd represents the background, $G_i$ and $B_i$ represent the proportional constant, $P_i$ represents the fractal dimension at the hierarchy i, $R_{g,i}$ represents a structural length at the hierarchy i, and N represents the number of hierarchies.

2. The carbon film according to claim 1, having carbon nanotube aggregates in a size of $1.0\times10^5$ Å or more and $4.0\times10^7$ Å or less in a wavenumber range of 0.0001 (1/Å) or more and 0.001 (1/Å) or less when the scattering profile obtained by performing ultra-small-angle X-ray scattering on the at least one surface of the carbon film is fitted to Beaucage equation.

3. The carbon film according to claim 1, wherein the carbon film is a self-supporting film.

4. The carbon film according to claim 1, wherein the carbon film has a thickness of 5 μm or more and 1000 μm or less.

5. The carbon film according to claim 1, wherein the carbon film has a transmission attenuation rate of 20 dB or more for at least one frequency in a range of 1 GHz or more and 10 GHz or less.

* * * * *